United States Patent [19]

Trickey et al.

[11] Patent Number: 4,525,010
[45] Date of Patent: Jun. 25, 1985

[54] AIRCRAFT SEAT

[75] Inventors: Peter W. Trickey, Sherborne; David C. Netherway, Sturminster Newton; William S. Clifford, Martock, all of England

[73] Assignee: Westland plc, Somerset, England

[21] Appl. No.: 511,586

[22] Filed: Jul. 7, 1983

[30] Foreign Application Priority Data

Jul. 19, 1982 [GB] United Kingdom ............... 8221028

[51] Int. Cl.³ .............................................. B60R 21/10
[52] U.S. Cl. ................... 297/216; 244/122 R; 297/308
[58] Field of Search ............... 297/216, 307, 308, 309; 244/122 R

[56] References Cited

U.S. PATENT DOCUMENTS

| | | | |
|---|---|---|---|
| 2,971,566 | 2/1961 | Negroni | 244/122 R X |
| 3,532,379 | 10/1970 | Reilly et al. | 297/307 X |
| 3,985,388 | 10/1976 | Hogan | 297/216 |
| 4,408,738 | 10/1983 | Mazelsky | 297/216 X |
| 4,423,848 | 1/1984 | Mazelsky | 297/216 X |

Primary Examiner—Philip C. Kannan
Attorney, Agent, or Firm—Larson and Taylor

[57] ABSTRACT

An aircraft seat (11) particularly adapted as a pilot seat for a helicopter includes a seat bucket (12) having a back-rest portion (13) supported by an articulated support structure (14) adapted to react vertical, longitudinal and lateral loads and to permit normal vertical stroking of the seat by extension of any energy absorber (32) in the event that the support structure becomes misaligned in a hard landing. The structure comprises two parallel generally vertical guide tubes (15a, 15b). The lower ends of both guide tubes are attached to a cabin floor (17) by universally pivoted joints (18), the upper end of a first one of the guide tubes (15a) is pivotally attached to one end of a generally horizontal straight link (20) to react longitudinal loads only and the upper end of the second guide tube (15b) is pivotally attached at the apex of a generally horizontal triangular link (21) so as to react both lateral and longitudinal loads. A pair of spaced-apart collars (30, 31) are slidably mounted on each guide tube and are attached to the seat bucket in a load reacting manner that is compatible with the attachment of the respective guide tubes.

10 Claims, 8 Drawing Figures

AIRCRAFT SEAT

This invention relates to aircraft seats and is particularly concerned with a crashworthy pilot seat for helicopters.

Occupant protection and survival under crash conditions is of primary importance in helicopter design. Adequate protection requires that crash forces and decelerations transmitted through the helicopter structure are limited to within human tolerance levels. Seats have been designed with various different forms of integral energy absorbing means which allow the occupant of a seat to stroke downwards in a controlled manner thereby reducing the magnitude of deceleration that is experienced, whilst increasing its duration.

Conventionally, such seats have been designed for mounting on a floor or bulkhead structure, and floor warpage or bulkhead/frame buckling resulting from a heavy landing can adversely affect the correct operation of the seat. Furthermore, there is a danger that structural damage could result in a forced re-positioning of the seat with the result that the occupant may strike adjacent structure.

Accordingly the invention provides an aircraft seat including a seat bucket having a back rest portion attached to support means to permit generally vertical movements of the seat, and energy absorber means adapted to support the seat in an operative position wherein the support means comprise an articulated support structure adapted to react vertical, longitudinal and lateral loads.

Preferably the articulated support structure comprises two parallel generally vertical guide tubes supported at each end by pivoted attachments to aircraft structure.

Two vertically spaced-apart collars may be slidably located on each guide tube and may be attached to brackets on the back rest portion. Preferably, the collars on a first one of the guide tubes are attached to the brackets for pivotal movement about a vertical axis and the collars on the second guide tube are rigidly attached to the brackets.

A cross brace may interconnect the two guide tubes and may be attached thereto by universally pivoted joints permitting relative lateral movement of the guide tubes. Conveniently, the cross brace may support the upper end of a generally vertical energy absorber having its lower end pivotally attached to the back-rest portion.

The lower ends of the guide tubes may be attached to a cabin floor by universally pivoted joints and the upper end of said first guide tube may be attached by a universal pivoted joint to one end of a generally horizontal straight link, the other end of the straight link being attached to aircraft structure by a universally pivoted joint, whereas the upper end of said second guide tube may be attached by a universally pivoted joint to the apex of a generally horizontal triangular link, the base of the triangular link being attached to the aircraft structure by laterally spaced-apart universally pivoted joints.

In another aspect the invention provides an aircraft seat including a seat bucket and having a back-rest portion supported by two vertically spaced-apart pairs of collars slidably located around two generally vertical guide tubes so as to permit vertical movement of the seat, and an energy absorber adapted to support the seat in an operative position and damp said vertical movement, wherein the collars on a first one of the guide tubes are pivotally attached to the seat so as to react only longitudinal loads and the collars on the second guide tube are rigidly attached to the seat so as to react both lateral and longitudinal loads, the lower ends of both guide tubes are pivotally attached to aircraft structure so as to react vertical, lateral and longitudinal loads, the upper end of said first one of the guide tubes is pivotally attached to aircraft structure so as to react only longitudinal loads and the upper end of the second guide tube is pivotally attached to aircraft structure so as to react both lateral and longitudinal loads.

In yet a further aspect this invention provides an aircraft seat including a seat bucket having a back-rest portion supported by two vertically spaced-apart pairs of collars slidably located around two generally vertical guide tubes so as to permit vertical movement of the seat and an energy absorber adapted to damp vertical movement, wherein each of the collars on a first one of the guide tubes is attached to the seat by a joint pivoted about a vertical axis and each of the collars on the second guide tube is rigidly attached to the seat, the lower ends of both guide tubes are attached to aircraft structure by universally pivoted joints, the upper end of said first one of the guide tubes is attached to one end of a generally horizontal straight link by a universally pivoted joint and the other end of the straight link is attached to aircraft structure by a universally pivoted joint, the upper end of the second guide tube is attached to the apex of a generally horizontal triangular link by a universally pivoted joint and the base of the triangular link is attached to aircraft structure by laterally spaced-apart universally pivoted joints, and a cross brace interconnects the guide tubes and is attached thereto by universally pivoted joints permitting relative lateral movement of the guide tubes.

The invention will now be described by way of example only and with reference to the accompanying drawings in which.

Figure 1:
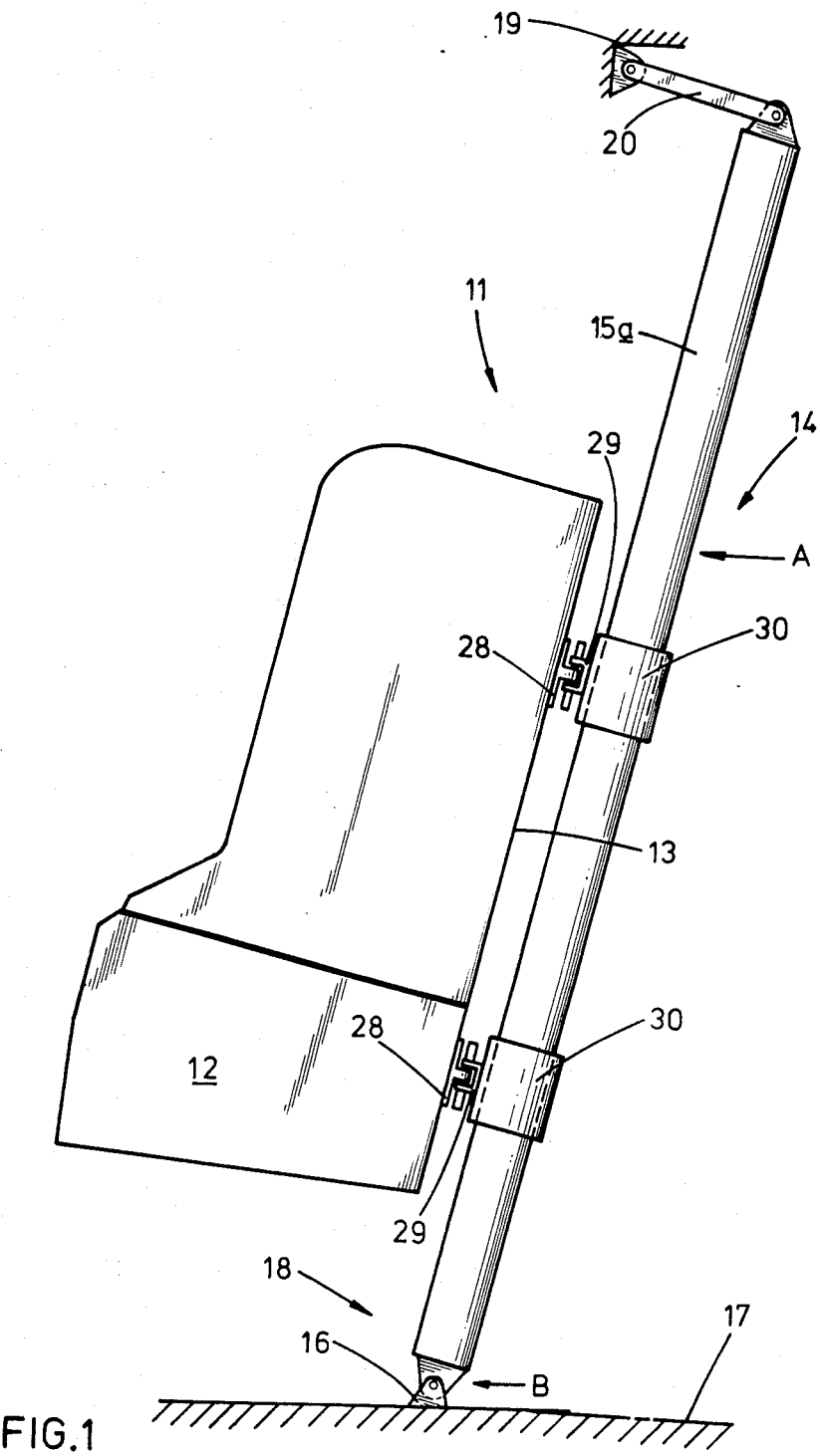
FIG. 1 is a side elevation of an aircraft seat assembly constructed according to this invention and located in a helicopter cabin.
Figure 2:
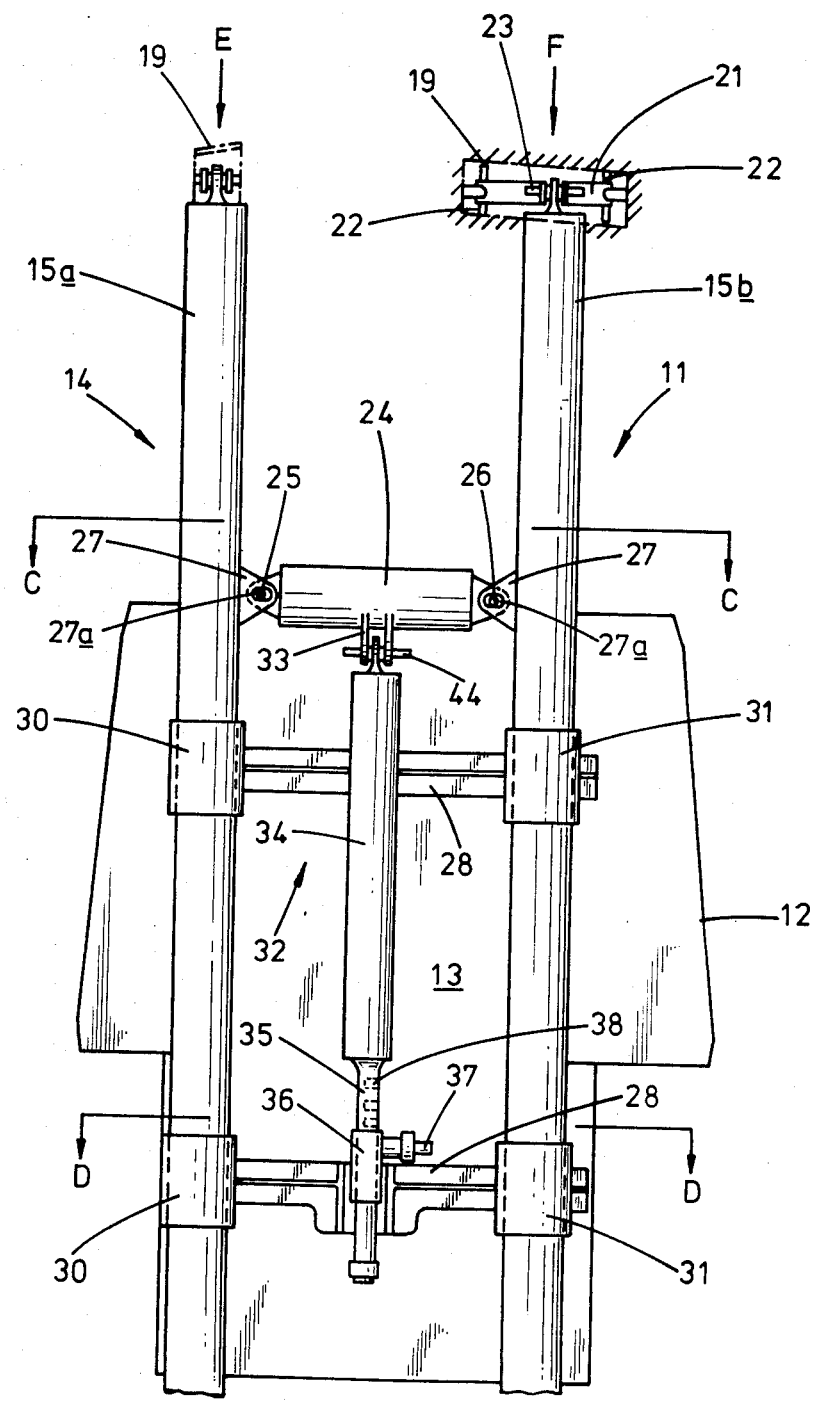
FIG. 2 is a fragmentary view in the direction of arrow A of FIG. 1.

Referring to FIGS. 1 and 2, an aircraft seat assembly 11 includes a seat bucket 12 having a back-rest portion 13 supported by an articulated support structure generally indicated at 14. In this description the seat is assumed to be installed as a forwardly facing seat intended for use by a helicopter pilot or co-pilot and the various references to lateral and longitudinal reflect such an installation and comply with the axes of a helicopter in which the seat is fitted.

Figure 3:
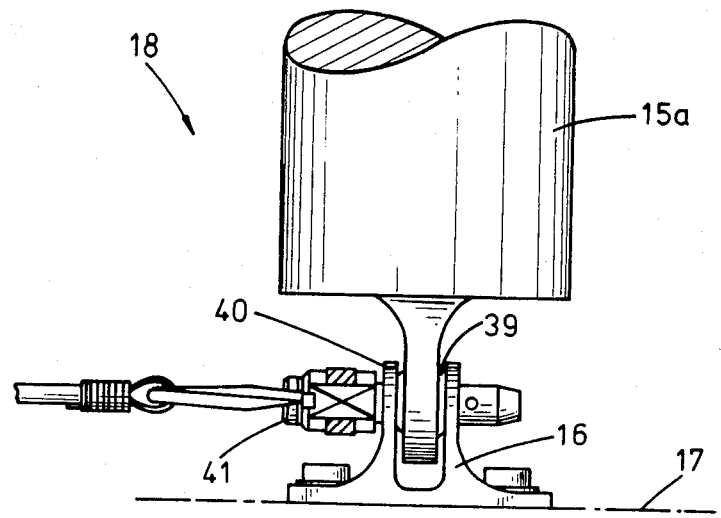
FIG. 3 is a fragmentary view taken in the direction of arrow B of FIG. 1.

The structure 14 includes two laterally spaced-apart guide tubes 15a and 15b extending upwardly and rearwardly at an angle of approximately twelve degrees from the vertical. The lower ends of both guide tubes 15a and 15b are attached to brackets 16, secured to a floor structure 17 by universally pivoted joints 18. A suitable construction for such a joint 18 is illustrated in FIG. 3 and consists of an apertured part-spherical bearing 39 attached at the end of tube 15a and located between spaced-apart apertured flanges 40 on the bracket 16. The parts are secured by a quick release pin 41 located through the mated apertures in the flanges 40 and the bearing 39. The joint 18 thus permits universal pivotal movement of the guide tube 15a relative the bracket 16 yet is capable of reacting end and side loads. Similar joints are used extensively throughout the construction of the articulated support structure 14, and to avoid repetition in the following description it is to be understood that by a universally pivoted joint we mean a joint similar to that above described and illustrated in FIG. 3.

The upper ends of tubes 15a and 15b are attached to a cabin roof structure 19 by generally horizontal rearwardly extending links 20 and 21 respectively.

Figure 6:
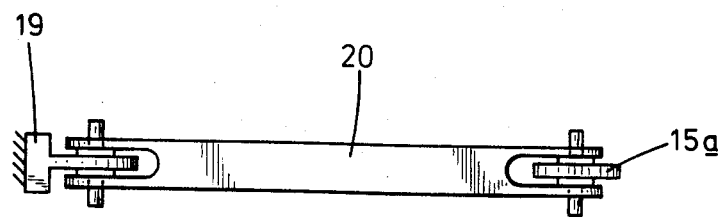
FIG. 6 is a fragmentary view taken in the direction of arrow E on FIG. 2.
Figure 7:
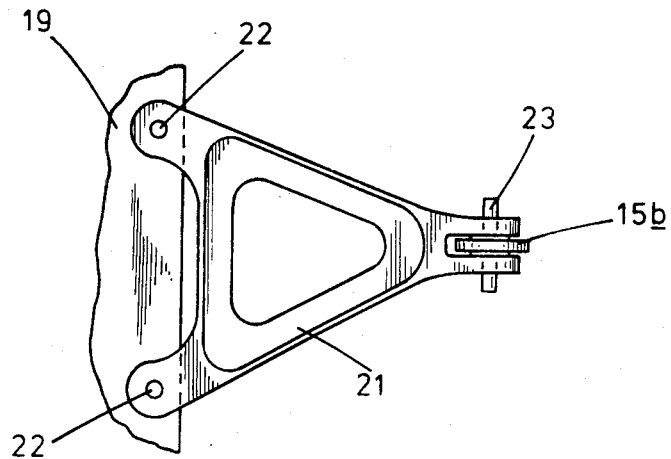
FIG. 7 is a view on arrow G of FIG. 2.

As illustrated in FIGS. 1, 2 and 6, link 20 is a straight link attached at its ends through universally pivoted joints to the structure 19 and the upper end of tube 15a. Link 21 is triangular in plan (FIGS. 2 and 7), the base of the link 21 being attached to structure 19 by laterally spaced-apart universally pivoted joints 22 and the apex being attached to the tube 15b by a universally pivoted joint 23.

A cross brace 24 interconnects the guide tubes 15a and 15b between their ends, and is attached thereto through universally pivoted joints 25 and 26 to lugs 27 welded externally of the tubes. In this case the mating apertures in the lugs 27 are slotted laterally as indicated at 27a (FIG. 2).

Figure 4:
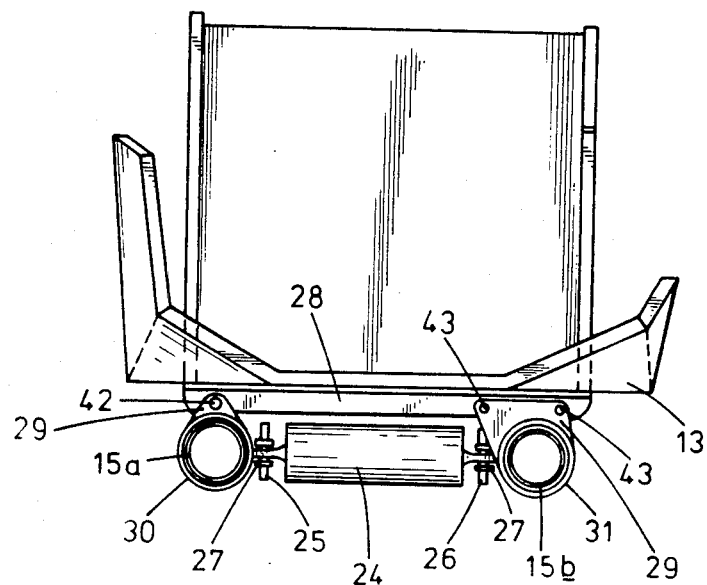
FIG. 4 is a sectioned view taken along lines C—C of FIG. 2.
Figure 5:
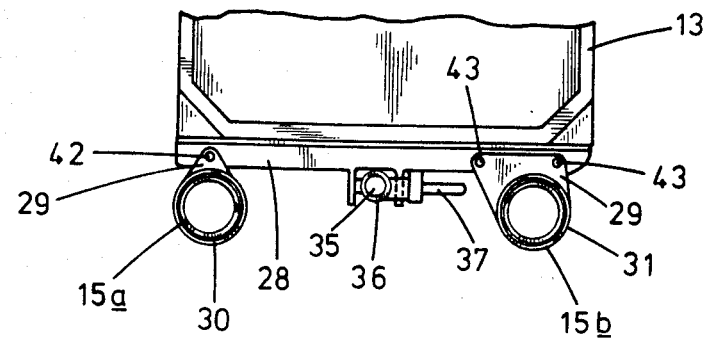
FIG. 5 is a sectioned view taken along lines D—D of FIG. 2.

The seat bucket 12 is slidably mounted on the guide tubes 15a and 15b. To this end, vertically spaced-apart transverse brackets 28 on the back rest portion 13 are attached to flanges 29 formed on vertically spaced-apart collars 30 and 31 located respectively around the guide tubes 15a and 15b. It will be noted from FIGS. 4 and 5 that the attachments comprises a single vertically pivoted bolted attachment 42 on the collars 30 on the tubes 15a, and two laterally spaced-apart vertical bolts 43 on the collars 31 on the tube 15b.

A low friction liner (not shown) is located between the external surfaces of the guide tubes 15a and 15b and the internal surfaces of the respective collars 30 and 31.

The upper end of a generally vertical energy absorber 32 (FIG. 2) is attached through a universally pivoted joint 44 to lugs 33 located centrally of the cross brace 24, the absorber conventionally comprising a cylinder 34 and a piston 35 and incorporating absorber means (not shown) such as a frangible material e.g. honeycomb, or a hydraulic absorber. The piston 35 is located through a sleeve 36 pivotally attached to the lower bracket 28 on the back-rest portion 13, and a spring-loaded plunger 37 is selectively engageable in any one of a plurality of vertically spaced-apart indents 38 in the piston 35 to normally support the seat bucket at a desired vertical height. The plunger 37 is operable by a lever (not shown) attached to the seat.

The collective use of the universally pivoted joints, pivoted joints and links in the construction and attachment of the articulated support structure 14 allows for airframe deflections in all senses coupled with determined deflections due to seat loading conditions, whilst maintaining full freedom of movement of the seat bucket on the guide tubes 15a, 15b to ensure correct operation of the energy absorber.

Figure 8:
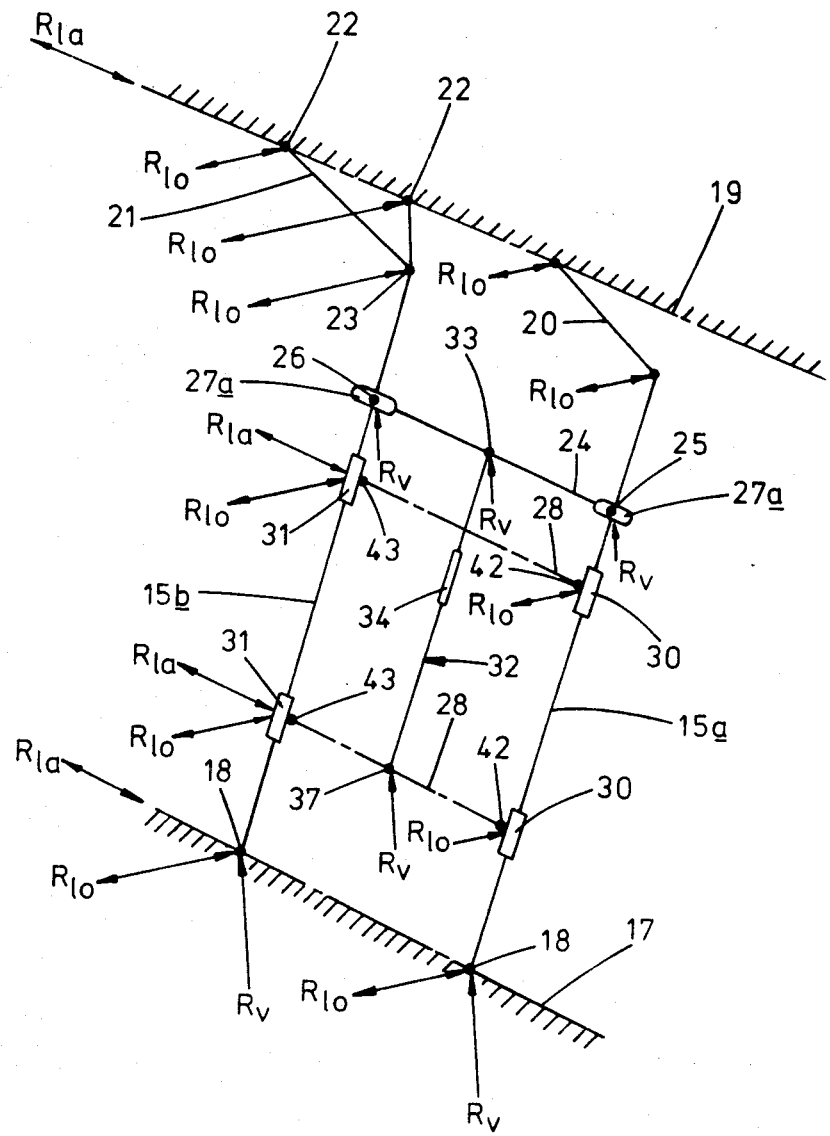
FIG. 8 is a diagrammatic illustration of the seat of this invention.

Operation of the seat assembly will now be described with particular reference to FIG. 8 in which identification numerals corresponding to those of the above description have been used. The various load reactions described below are referenced RV (vertical), RLA (lateral) and RLO (longitudinal) in FIG. 8.

Before describing operational details it will be useful to describe the load transmitting and reacting capabilities of the various component parts of the articulated support structure 14.

Thus, joints 18 are capable of reacting vertical, longitudinal and lateral loads from the respective tubes 15a and 15b to the floor structure 17 whilst permitting universal pivotal movement of the tubes. Straight link 20 is able to react longitudinal loads only whilst triangular link 21 is capable of reacting both lateral and longitudinal loads.

Due to the single pivoted attachment 42 of collars 30 to the brackets 28, the collars 30 are capable of rotational movement relative tube 15a and are therefore capable of reacting longitudinal loads only. It will be noted that in this operational aspect, the attachment of the collars 30 is compatible with the capability of link 20. In contrast, the double bolted attachment of the collars 31 on tube 15b to the brackets 28 serves to prevent relative rotation of the collars 31 with the result that the collars 31 are capable of reacting both longitudinal and lateral loads which is compatible with the facility provided by triangular link 21 attaching the top of tube 15b.

Cross brace 24 serves only to transmit vertical loads from the energy absorber 32 to guide tubes 15a and 15b. The slotted apertures in lugs 27 and the universally pivoted joints 25 and 26 enable the cross brace 24 to permit relative movement of the guide tubes 15a and 15b.

Having adjusted the vertical height of the seat bucket to suit the occupant, the energy absorber 32 supports the seat and the occupant in the desired position in known manner during normal operation.

In the event of a hard or crash landing the various loads imposed on the seat assembly are absorbed as follows:

Vertical Loads

Vertical loads are absorbed by the energy absorber 32 in a conventional manner resulting in a controlled downward stroking of the seat bucket 12. In the present invention this downward stroking is facilitated by sliding of the collars 30 and 31 downwardly along the respective guide tubes 15a and 15b, the vertical loads being transferred into the cross brace 24, and through the pivoted attachments 25 and 26 producing end loads in the guide tubes 15a and 15b which are reacted at the universally pivotable joints 18.

Longitudinal (fore-and-aft) Loads

Longitudinal loads are taken out through the collars 30 and 31 into the guide tubes 15a and 15b and are reacted at the universally pivoted joints 18 and at the links 20 and 21.

Lateral (transverse) Loads

Lateral loads are taken out through the collars 31 into the guide tube 15b and are reacted at the universally pivoted joint 18 at the bottom of guide tube 15b and through the triangular link 20.

Thus, apart from conventional occupant protection against vertical loads provided by the energy absorber 32, the seat assembly of the present invention provides added protection against longitudinal and lateral loads. This is due to the articulated support structure 14 which is constructed so as to retain the ability to react vertical, longitudinal and lateral loads in the event of misalignment of its component parts, with the result that floor warpage and local structural distortions can be accommodated without hindering or preventing the normal downward stroking of the seat bucket 12 even in the event that the guide tubes 15a and 15b are moved out of their normal parallel relationship.

Whilst one embodiment has been described and illustrated it will be understood that various modifications may be made without departing from the scope of the invention. For example, the quick-release pins in the universally pivoted joints could be replaced by shouldered bolts, and other types of universally pivoted joints such as ball and socket joints could be used. Because the links 20 and 21 are capable of performing their described functions either in compression or in tension, they could be oriented to extend generally forwardly from the helicopter structure if this facilitated fitment in a particular helicopter cabin. Longitudinal seat adjustment means can be incorporated, for instance by locating the brackets 16 on longitudinally extending guide rails or tubes with quick release means to enable a selection of a suitable location. The seat of this invention can be used in other locations in an aircraft and may for example be used as a sideways facing seat in a helicopter cabin. In such an installation the various references to lateral and longitudinal load reactions will be reversed.

What is claimed is:

1. An aircraft seat including a seat bucket and a back-rest portion, support means attached to said back-rest portion to permit generally vertical movements of the seat, and energy absorber means adapted to support the seat in an operative position, seat support means comprising an articulated support structure adapted to react to vertical, longitudinal and lateral loads, the articulated structure including two parallel generally vertical guide tubes supported at each end by pivoted attachments to aircraft structure.

2. A seat as claimed in claim 1, wherein two vertically spaced-apart collars are slidably located on each guide tube and are attached to brackets on the back-rest portion.

3. A seat as claimed in claim 2, wherein the collars on a first one of the guide tubes are attached to the brackets for pivotal movement about a vertical axis and the collars on the second guide tube are rigidly attached to the brackets.

4. A seat as claimed in claim 3, wherein the lower ends of the guide tubes are attached to a cabin floor by universally pivoted joints, the upper end of said first guide tube is attached by a universal pivoted joint to one end of a generally longitudinal straight link the other end of the straight link being attached to the aircraft structure by a universally pivoted joint, whereas the upper end of the second guide is attached by a universally pivoted joint to the apex of a generally horizontal triangular link and the base of the triangular link is attached to the aircraft structure by laterally spaced-apart universally pivoted joints.

5. A seat as claimed in claim 1, wherein a cross brace interconnects the two guide tubes and is attached thereto by universally pivoted joints permitting relative lateral movements of the guide tubes.

6. A seat as claimed in claim 5, wherein the cross brace supports the upper end of a generally vertical energy absorber having its lower end pivotally attached to the back-rest portion.

7. An aircraft seat including a seat bucket having a back-rest portion supported by two vertically spaced-apart pairs of collars slidably located around two generally vertical guide tubes so as to permit vertical movement of the seat, and an energy absorber adapted to support the seat in an operative position and damp said vertical movement, wherein the collars on a first one of said guide tubes are pivotally attached to the seat so as to react only longitudinal loads and the collars on the second guide tube are rigidly attached to the seat so as to react both lateral and longitudinal loads, the lower ends of both guide tubes are pivotally attached to aircraft structure so as to react vertical, lateral and longitudinal loads, the upper end of the said first one of the guide tubes is pivotally attached to aircraft structure so as to react only longitudinal loads and the upper end of the second guide tube is pivotally attached to aircraft structure so as to react both lateral and longitudinal loads.

8. A seat as claimed in claim 7, and including a cross brace interconnecting the guide tubes by pivoted attachments adapted to react vertical loads.

9. A seat as claimed in claim 8, wherein the pivoted attachments of the cross brace include lateral slots permitting relative lateral movement of the guide tubes.

10. An aircraft seat including a seat bucket having a back-rest portion supported by two vertically spaced-apart pairs of collars slidably located around two generally vertical guide tubes so as to permit vertical movement of the seat, and an energy absorber adapted to damp vertical movement, wherein each of the collars on a first one of said guide tubes is attached to the seat by a joint pivoted about a vertical axis and each of the collars on the second guide tube is rigidly attached to the seat, the lower ends of both guide tubes are attached to aircraft structure by universally pivoted joints, the upper end of said first one of the guide tubes is attached to one end of a generally horizontal straight link by a universally pivoted joint and the other end of the link is attached to aicraft structure by a universally pivoted joint, the upper end of the second guide tube is attached to the apex of a generally horizontal triangular link by a universally pivoted joint and the base of the triangular link is attached to aircraft structure by laterally spaced-apart universally pivoted joints, and a cross brace interconnects the guide tubes and is attached thereto by universally pivoted joints permitting relative lateral movement of the guide tubes.

* * * * *